(12) United States Patent
Kramer et al.

(10) Patent No.: US 7,182,524 B2
(45) Date of Patent: Feb. 27, 2007

(54) UNIVERSAL ADAPTER

(75) Inventors: Anne Kramer, Berlin (DE); Jörg Adomeit, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 10/487,656

(22) PCT Filed: Jul. 27, 2002

(86) PCT No.: PCT/EP02/08112

§ 371 (c)(1),
(2), (4) Date: Jun. 15, 2005

(87) PCT Pub. No.: WO03/019260

PCT Pub. Date: Mar. 6, 2003

(65) Prior Publication Data

US 2005/0286833 A1   Dec. 29, 2005

(30) Foreign Application Priority Data

Aug. 23, 2001   (DE) ................. 101 41 449

(51) Int. Cl.
*G02B 6/36* (2006.01)
*G02B 6/38* (2006.01)
*G02B 6/40* (2006.01)
*G02B 6/00* (2006.01)

(52) U.S. Cl. .................. 385/78; 385/53; 385/55; 385/56; 385/60; 385/70; 385/72; 385/76; 385/77; 385/88

(58) Field of Classification Search ............. None
See application file for complete search history.

(56) References Cited

U.S. PATENT DOCUMENTS 5,317,663 A   5/1994   Beard et al.

(Continued)

FOREIGN PATENT DOCUMENTS

DE   199 05 240 A1   2/1999

(Continued)

OTHER PUBLICATIONS

ADC Telecommunications Inc., "LX.5 Small-Form-Factor Connector", (Copyright 2001) 4 pages.*

(Continued)

*Primary Examiner*—Brian Healy
*Assistant Examiner*—Derek L. Dupuis
(74) *Attorney, Agent, or Firm*—Merchant & Gould P.C.

(57) ABSTRACT

The invention relates to an adapter of the type where a coupling for glass fiber plug-in connectors is inserted from the front into a front plate and is locked by a spring. The inventive adapter comprises a one-piece or two-piece housing which comprises at least on one side a flange projecting from the cross-section of the housing against which the front plate rests, at least one plug-in connector recess which is disposed on the front end and/or rear end with respect to the front plate, and at least one form-fit detachable locking device for the plug-in connector. Every plug-in connector recess comprises an opening for alternately receiving at least two of three different plug-in connector types LX.5, LC and MU of and one respective locking device suitable for the respective type. The adapter can be configured as a simplex plug-in coupling for alternately receiving all three types, or as a duplex plug-in connector for alternately receiving the plug types LX.5 and LC. The inventive adapter further comprises a pin for actuating an opening flap of the plug type LX.5 on a displaceable element on a side wall of the adapter. The adapter can further be closed by a pivoted cap that is detachably mounted on the housing, and a catch spring, actuated from the front and disposed on the housing, that engages behind the front plate and releases the catch spring from the front plate.

23 Claims, 4 Drawing Sheets

U.S. PATENT DOCUMENTS

| | | | |
|---|---|---|---|
| 5,751,874 A | 5/1998 | Chudoba et al. | |
| 6,022,149 A | 2/2000 | So et al. | |
| 6,095,694 A | 8/2000 | Chudoba et al. | |
| 6,102,581 A | 8/2000 | Deveau et al. | |
| 6,220,763 B1 * | 4/2001 | Stephenson | 385/73 |
| 6,296,398 B1 * | 10/2001 | Lu | 385/60 |
| 6,513,990 B2 | 2/2003 | Kühne | 385/70 |
| 2002/0025121 A1 * | 2/2002 | Stephenson et al. | 385/55 |

FOREIGN PATENT DOCUMENTS

| | | |
|---|---|---|
| DE | 100 47 898 A1 | 4/2002 |
| EP | 0 590 586 A1 | 4/1994 |
| EP | 0 613 030 B1 | 8/1994 |
| EP | 0 697 607 B1 | 2/1996 |
| EP | 0 667 544 B1 | 12/1999 |
| EP | 1 091 226 A1 | 4/2001 |
| WO | WO 00/16145 * | 3/2000 |

OTHER PUBLICATIONS

International Search Report (5 pages).

"A Diamond-Studded Polishing Family," *SENKO Link*, Issue #2, 2 pages (Mar. 2001).

"Connector Port Adaptor Kit," http://web.archive.org/web/20010802064355/http://fiberplus.com/cpakit.htm, 3 pages (Copyright 2001).

"International Standard CEI IEC 61754-6," First Edition, 2 pages (1997-2005).

"International Standard MU Connector," 1 page.

"Krone FiberPLUS® Patchcords und Pigtails," 5 pages.

"LX.5® Small-Form-Factor Connector," 4 pages (Copyright 2001).

"SC Backplane Connector System (BSC/BSCII)," 1 page.

"SC-LC Adapter," http://web.archive.org/web/20010309210024/www.senko.com/ofc2001/pro__sc-lc.html, 1 page (Date Printed Aug. 1, 2006).

"Universal Panel Mount Adaptors," http://web.archive.org/web/20010409210647/http://www.fiberplus.com/upa.htm, 3 pages (Copyright 2001).

ADC Product Information sheet; *Increased Fiber Termination Density*, 10/00 - 1236, 1 page.

*LX.5 Connectors*, http://www6.adc.com/ecom/SilverStream.../WPS__Out__Hierarchy.html?ID=OND24695&ItemId=OND2469, 1 page (© 2001).

*Improved Safety*, LX.5 Connector Family, 1 page.

* cited by examiner

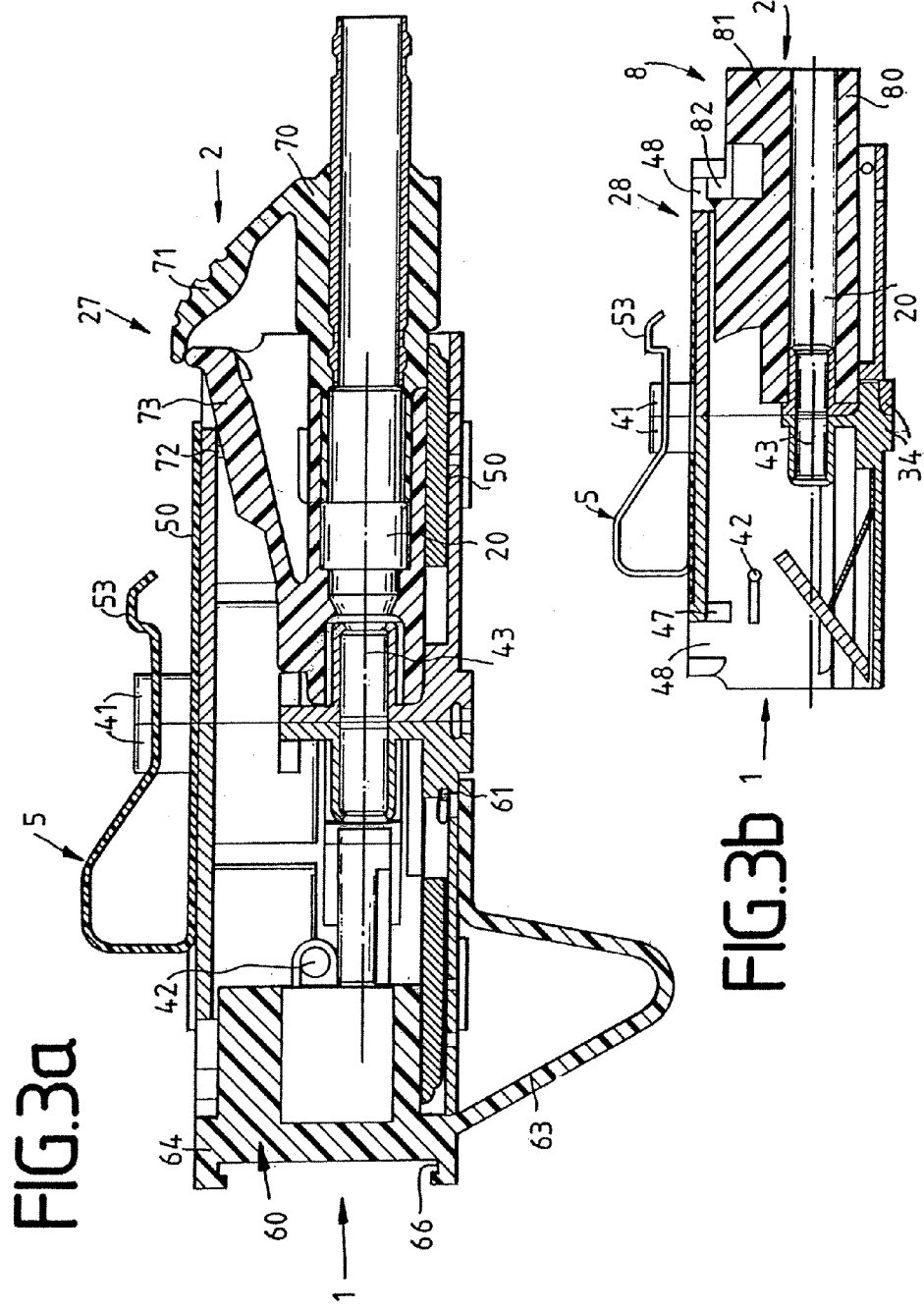

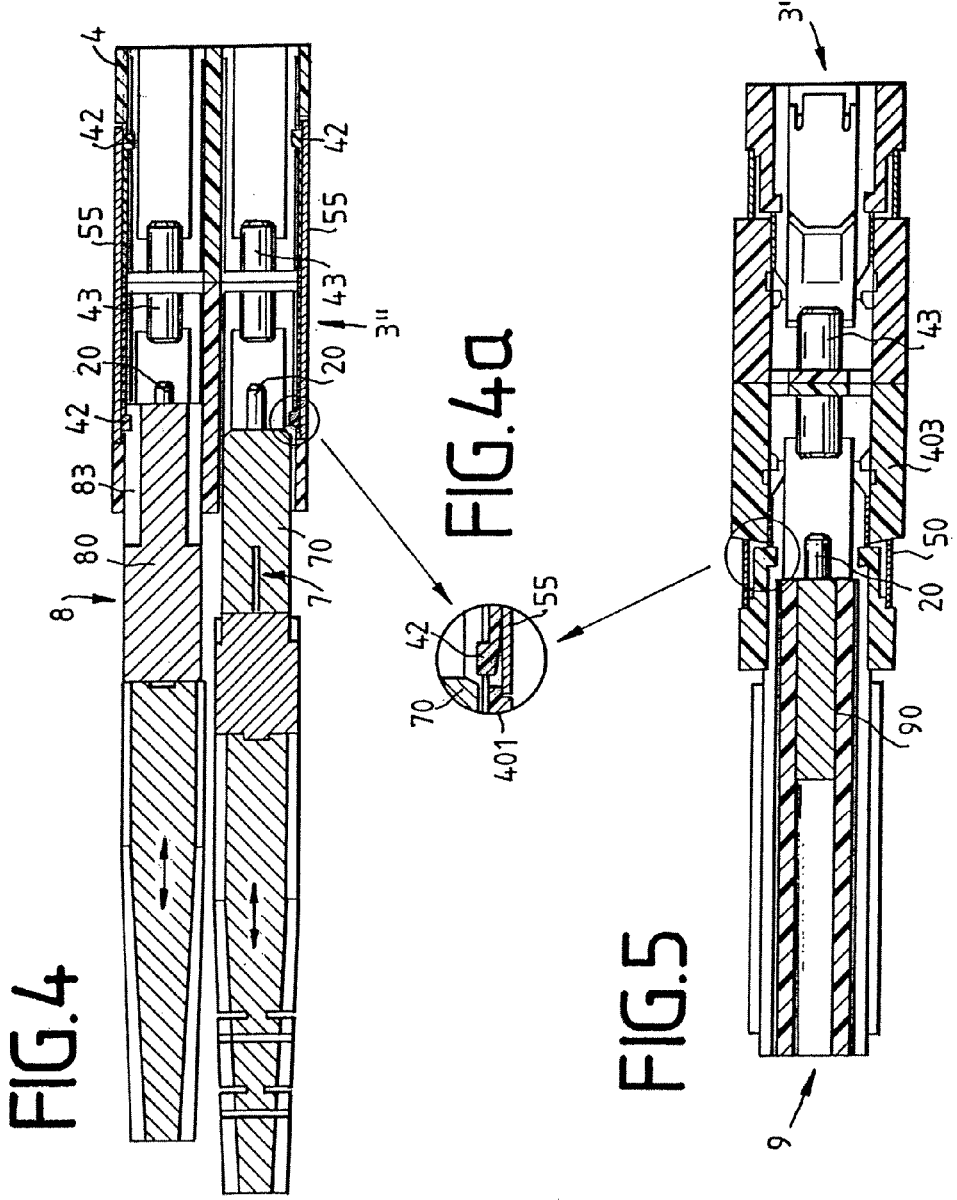

UNIVERSAL ADAPTER

FIELD OF INVENTION

The invention relates to an adapter in the manner of a coupling, which can be inserted into a front panel from a front side and can be arrested by a spring, for optical-fiber plug-in connectors with a one-piece or two-piece housing, which has at least on one side a flange protruding from the cross section of the housing for abutment on the front panel, at least one plug-in connector receptacle at the front and/or rear with respect to the front panel and at least one positively locking releasable arresting mechanism for plug-in connectors.

BACKGROUND OF THE INVENTION

Couplings or adapters for optical-fiber plugs connect optical fibers for laser light. Couplings of this type are usually fixed in a housing wall or front panel, with the result that plug receptacles for optical-fiber plugs are provided on both sides of the front panel. Until recently, optical-fiber connectors of this type were frequently produced in the form of SC plugs or SC connectors.

However, these are increasingly being replaced by smaller forms with the designations LX.5, LC and MU (Internet advertisement on Aug. 6, 2001 at 15.25 under the address http://www.bicsi.org/prico8/sld001.htmsld035.htm).

LC connectors are standardized in IEC 61751-20 and MU connectors are standardized in IEC 61751-6. LX.5 plugs have not yet been standardized; LX.5 is a registered trademark of the company ADC Telecommunications, Inc., US; plugs of this type have improved properties (Internet presentation on Aug. 6, 2001 at 15.28 under http://stele.adc-.com/Library/Literature/1236.pdf).

SC connectors and corresponding couplings are disclosed in U.S. Pat. No. 5,317,663. The plug-in connectors are held in the coupling on both sides by blocking cams which engage in depressions on both sides of the connector when the optical-fiber centering devices have reached their desired position. The adapters there, for SC-simplex connectors, are provided with shutters against laser light, arranged in the coupling.

A coupling of the type "BSC II-Adapter with Shutter," for a SC connector, could be seen on the Internet on Aug. 6, 2001 at 15.35 under the address http://www.molex.com. A shutter is understood as meaning a pivotally attached flap in front of a plug-receptacle opening which is intended to prevent a fitter from being injured by laser light during the insertion of SC connectors. The shutter has a warning about lasers.

EP 0 590 586 A1 discloses a coupling made up of two parts for two MU connectors, a reduced-size further development of the SC connector which can be fastened on a front panel by means of flanges projecting from one side of the coupling, with a springing-back spring next to the flange arresting the coupling behind the front panel after it has been pushed into a corresponding opening. The plug-in connector is held in the coupling in a way similar to the SC connector.

WO 00/16145 discloses fiberoptic connectors and couplings of the type described. Smaller forms of connector of the LX.5 type are presented, having at the front of the connector a cover which automatically opens as soon as a laser shutter against a return spring, arranged in the coupling, has been passed. During the insertion phase, a pin on the plug-in connector, protruding fixedly into the interior of the coupling, pushes open the cover held closed by a spring, in order that the optical fiber in the plug-in connector is exposed for conducting light to a plug-in connector lying opposite in the adapter. The connector engages with its two special cams on a resilient lever on the housing of the plug-in connector in a complimentarily shaped catch on the coupling, which are arranged laterally of the longitudinal axis of the connector and of the coupling, respectively, and thereby hook into one another. The cams can be unlocked from their catch by means of the lever on the connector.

LC connectors are also known from EP 1091226 A1. They have a locking and releasing lever mechanism arranged centrally on one side of the connector, by which a positive connection produced in the coupling when the connector is inserted can be released. The connection is produced by two keys arranged laterally on the lever, which engage in a keyway lying opposite in the coupling when the connector has reached its desired position in the coupling. These couplings also have flanges and a latching spring for mounting in a front panel.

Instead of a large-sized SC coupling, it is possible to fit two couplings for LX.5, LC or MU connectors into a front panel. Although some of the plug-in connectors are standardized, on different systems of different users there are different plug-in connectors which come together but do not fit into the same coupling.

On Aug. 17, 2001, a universal adapter system for the plug-in connectors of the FC, ST, SC, SMA, 04 and BICONIC types could be seen under the Internet address http://www.fiberplus.com/cpakit.htm and a Universal Panel Mount Adapter, with which the ST or FC types can be coupled at a front panel to each other or to DIN or E2000 plug-in connectors, was advertised under the address http://www.fiberplus.com/upa.htm. An adapter for the coupling of MU types to LC types by simple mechanical screwing of slip-on ferrules for optical fibers with threaded rings is also provided. The fitting and removal of the adapters is time-consuming and requires great dexterity, in particular in the case of the small plug-in connectors, the ferrules of which have diameters of only 1.25 mm, as compared with 2.5 mm in the case of the SC connectors.

On Aug. 6, 2001 at 15.30, along with LC plugs and MU plugs with matching adapters for a simplex or duplex application, also presented on the Internet under the address http://www.senko.com/senkoadv/ was a SC-LC adapter device, which can be attached to a front panel and has at the front a plug receptacle for a LC plug and at the rear a plug receptacle for a SC plug. This coupling cannot be released, or only laboriously, from the front side once it has been fitted into the front panel from the front side and hooked behind the front panel by means of an expanding spring. This type of fastening is predominantly encountered in the case of all couplings that are not screwed on.

For this reason, the invention is based on the problem of providing an adapter which has the advantages of the known plug-in connectors and couplings but avoids their disadvantages.

SUMMARY OF THE INVENTION

The solution for an adapter of the generic type includes a connector receptacle having an opening for the alternate reception of at least two of three different types, LX.5, LC and MU, of plug-in connectors and in each case an arresting mechanism suitable for the type.

On account of the different arresting systems of the plug-in connectors and their position and shape and also function, this solution is unknown and surprising, as demonstrated by the extensive prior art and worldwide proliferation of these types of plug-in connectors.

This solution can be realized most simply if the arresting mechanisms for the types LX.5 and LC are arranged on the same side of the coupling and the arresting mechanism for the MU type is attached on other sides of the adapter, offset by 90°.

This also made possible the development to the extent that the adapter is designed as a simplex plug-in coupling for the alternate reception of all three types, while it is determined by the position of the ferrule that only adapters for the alternate reception of the plug types LX.5 and LC can be designed as a duplex plug-in coupling.

The problem of accommodating the pin for actuating a cover of the plug type LX.5 was solved by said pin being arranged on a displaceable element on a side wall of the adapter, preferably by the displaceable element being formed in the side wall as an integral spring element. However, this element may also be designed differently, for example the pin may also be displaced by the plug-in connectors—apart from in the case of LX.5—in the direction of insertion.

In embodiments of the invention, it is intended that the coupling is closed if need be, for protection against dust or protection from the laser light; according to the invention, by the fact that the opening of the receptacle can be closed by a cap which can be pivotally and releasably attached to the housing. For this purpose, the cap is preferably inserted into a snap-action device, for example a hole for an engaging stud, on the outside of the housing. For the purposes of inscription, such as concerning the type of plug-in connectors to be inserted or for a warning, the cap has on the outside a guide for the pushing in of an identification plate.

Furthermore, the adapter is intended to be able to be fitted releasably in a front panel from the front side, for simple mounting and removal. For this purpose, the adapter is provided with a latching spring, which is arranged on the housing and can be actuated from the front side, for gripping behind the front panel and releasing the latching spring from the front panel.

The latching spring is preferably designed as an unsupported resilient tongue, which can extend through an opening in the flange and in the front panel. For mounting and establishing the coupling, in this case the latching spring has a spring frame, which grips around the housing on at least three sides, extends through the flange and has the resilient tongue as an integral part.

In order that this type of design requires as little space as possible, the adapter is designed in such a way that the plug receptacles form the largest housing cross section at their openings and the housing surface is provided in the direction of the flange with set-back portions for the abutment of parts of the spring frame, the mounted spring frame not protruding beyond the cross section of the housing at the plug receptacle. A coupling attached in such a way can be removed from the front panel without interrupting the laser connection.

The invention is to be explained and the problems solved by it are to be illustrated for a person skilled in the art on the basis of exemplary embodiments with reference to the drawings, in which:

BRIEF DESCRIPTION OF THE DRAWINGS

FIG. 3a shows a longitudinal section through an adapter according to FIG. 2;

FIG. 3b shows a longitudinal section through an adapter according to FIG. 2, but the LC plug-in connector has been exchanged for an LX.5 plug-in connector and the cap has been removed;

FIG. 4 shows a longitudinal section through an adapter according to FIG. 6, but without a cap and with partly inserted LC and LX.5 plug-in connectors;

FIG. 4a shows a detail with a latching pin for LX.5 connectors;

FIG. 5 shows a section through a simplex adapter according to figure 2, but without a cap and with a partly inserted plug-in connector of the MU type.

DETAILED DESCRIPTION OF THE INVENTION

Identical designations refer to parts of an identical or similar function. The schematic representation of the parts is enlarged in comparison with reality by a factor of approximately 5 to 20.

Figure 1:
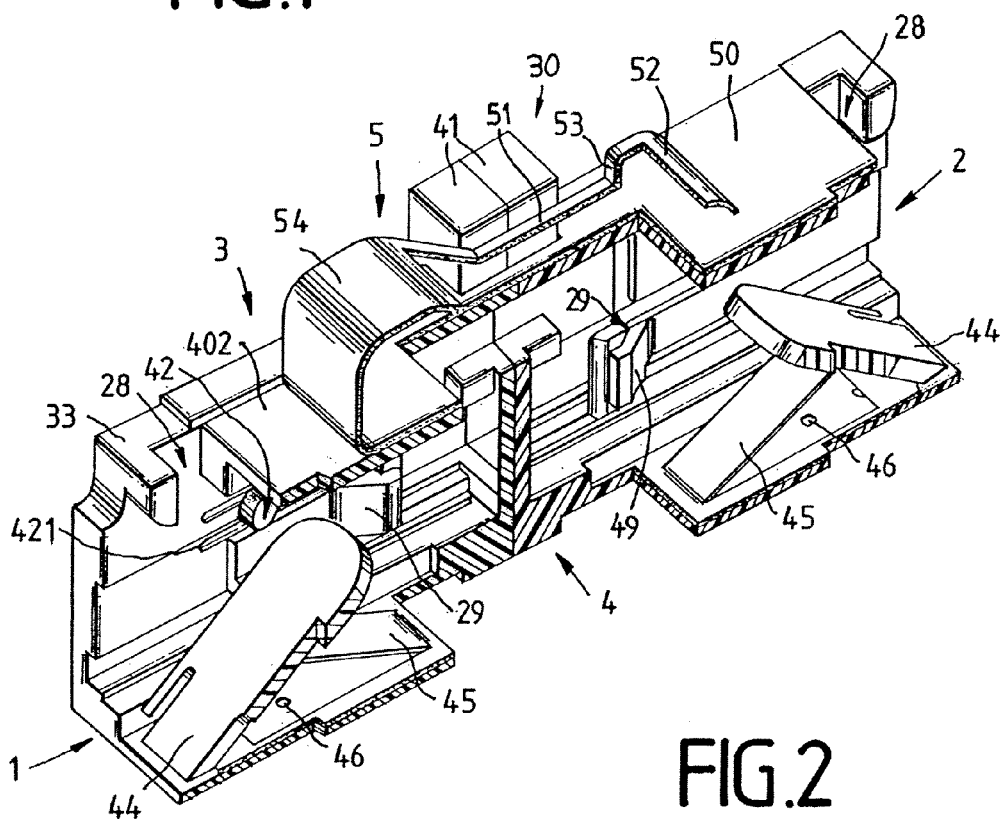
FIG. 1 shows an offset longitudinal section in a perspective view through an adapter according to the invention.

FIG. 1 shows in principle a multiply offset longitudinal section through an empty coupling for optical-fibre connectors, designed here as a universal adapter 3 with a common housing 30, made up of two mirror-invertedly identical front and rear housing parts 31 and 32, respectively. They meet at the flanges 41 and are, for example, adhesively bonded there, or else are only held together by a latching spring 5 or the frame 50 of the latter; alternatively, a positive connection 34 (FIG. 3b) of the parts 31, 32 is possible.

The flanges 41, designed as stubs, allow a resilient tongue 51 to pass through centrally in a clearance on the surface 402 of the housing 4, said tongue being integrally attached to the metal spring frame 50 and its extended end 52 having a lug 53 projecting from it, which can engage behind a front panel 10 (FIG. 6) and consequently arrest the adapter 3 in the front panel. By pressure on the clip 54, the lug 53 is released and the adapter can be pulled out of the front panel without the plug-in connectors having to be removed from the adapter 3.

The housing, which may also be in one piece, has two plug-in connector receptacles 1 and 2 at the front and rear, respectively.

Figure 2:
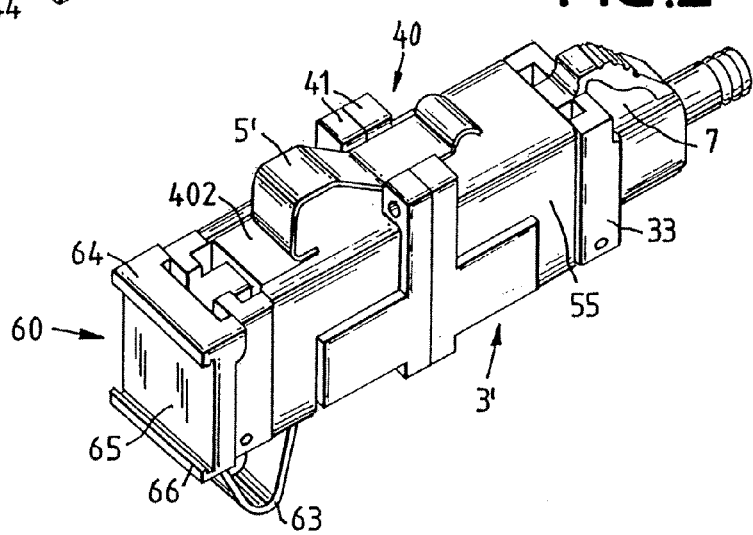
FIG. 2 shows a perspective plan view of a first simplex adapter according to the invention with an inserted LC plug-in connector at the rear and a cap at the front.
Figure 6:
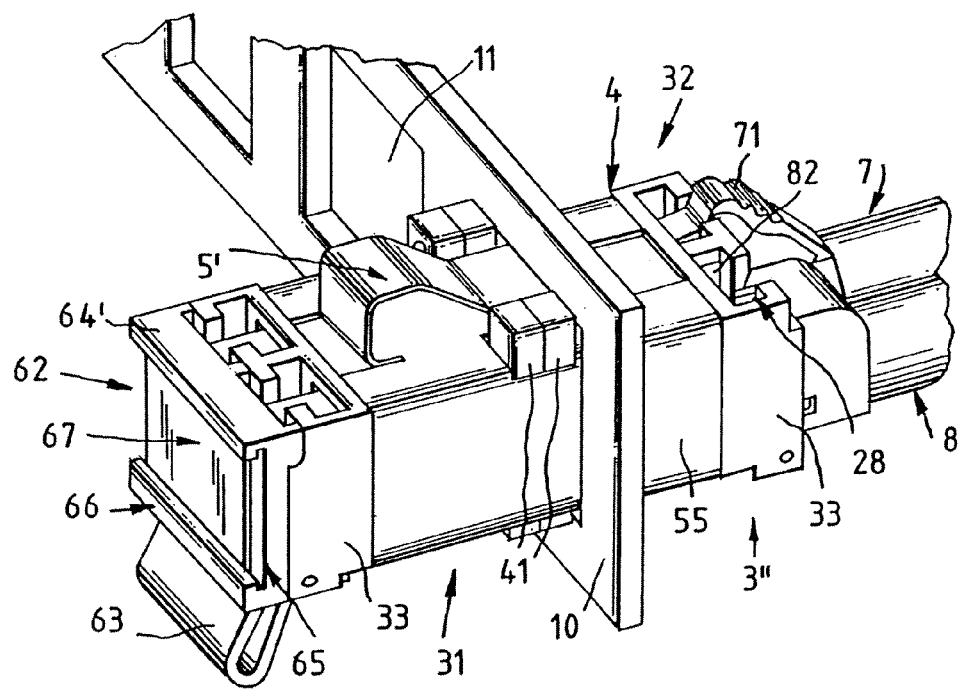
FIG. 6 shows a perspective plan view from the front side of a duplex adapter inserted into a front panel with plug-in connectors of the LC and LX.5 types inserted at the rear and an identification-bearing cap at the front.

In principle, this representation is identical for the simplex adapter according to FIG. 2 and the duplex adapter according to FIG. 6, apart from different wall thicknesses of the housing. The cross sections of the openings and the lateral guides in the walls of the adapter are tailor-made for the cross section of the plug-in connectors of the LC, LX.5 and MU 7, 8, 9 types.

In extension of the openings of the plug-in connector receptacles 1, 2, a centering device 43 for the ferrule or light guide 20 is recessed in the housing (FIGS. 3a, 3b). In order that a fitter cannot inadvertently look into a laser beam, the adapter includes a laser shutter 44, which is kept in the shown blocking position by a spring 45 and can be pressed down by plug-in connectors or a cap (FIG. 3a).

A bore 46 serves for the engagement of a latching pin 61 of the caps 60 (FIG. 3a) or 62 (FIG. 6).

The cover pin 42 serves for opening the cover, not represented, of an LX.5 plug-in connector 8, as known per se from the prior art. The cover pin 42 is arranged at the end of an unsupportedly mounted, flexibly displaceable tongue 421, which is an integral part of the side wall 401 of the housing 30 and responds in a way still to be described in FIGS. 4 and 5. The arresting mechanism 28 for LX.5 plug-in connectors 8 (FIGS. 3b and 6) comprises on the housing 30 a catch 48, in the manner of a recess on the upper side 402 thereof, into which the two cams 81 on the flexible lever 82 can engage.

The arresting mechanism 29 for MU plug-in connectors 9 comprises a blocking cam 49 in the side wall 401 of the housing; this cam 49 fits in a depression, not represented, of the plug-in connector 9 and in this way arrests the latter in the coupling. The arresting mechanism 27 of the LC plug-in connector 7 is represented in FIG. 3a.

FIG. 2 shows the adapter 3' as a simplex connector, complete: with cap 60 and LC plug-in connector 7 and latching spring 5'. It can clearly be seen that the simplex housing 40 has on its surface in the side wall 403 and the upper side 402 between the flanges 41 and the largest housing cross section. 33, close to the openings for the plug-in connector receptacles 1, 2, a depression in which the spring frame 50 comes to bear and consequently does not protrude beyond the extent of the largest cross section 33 of the housing.

FIG. 3a shows the simplex adapter 3' in longitudinal section with a cap 60 at the receptacle 1 of the adapter and a fully inserted LC plug-in connector 7 at the rear receptacle 2, with the result that the light guide 20 lies centrally with respect to the centering device 43, and in FIG. 3b, on the other hand, without a cap, but with an inserted LX.5 plug-in connector 8.

The LC plug-in connector 7 has at the arresting mechanism 27 on the plug housing 70 an arresting lever 73 with cams 72 on both sides, which engage behind a catch 47 on the housing 40 when the plug-in connector is in the position shown. With the release lever 71, pressure can be exerted on the arresting lever 73, with the result that the levers consisting of flexible plastic move downward and the cams 70 disengage from the catch 47, in order that the plug-in connector can be pulled.

FIG. 3b shows a similar situation for the fully inserted LX.5 plug-in connector 8, but for the sake of clarity without the, cover. The light guides 20 and centering device 43 lie in one axis; the arresting mechanism 28 is in operation. Attached to the release lever 81 of the plug housing 80 on both sides is a cam 82, which has engaged in the catch 48 of the adapter housing 40 and, after pressing down the flexible release lever 81, can be disengaged again.

FIG. 4 shows a duplex adapter 3'' for the simultaneous and parallel connecting of two light guides 20 within a coupling housing 4.

FIG. 5 shows an adapter 3' analogous to FIGS. 2, 3a, 3b with a partly inserted MU plug-in connector 9, but without its arresting mechanism, which was explained with respect to FIG. 1.

In FIG. 4, an LX.5 plug-in connector 8 is represented at the top and an LC plug-in connector 7 is represented at the bottom. The cover pin 42, necessary for the universal plugging of connectors, has in the case of the LX.5 connector 8 a camway 83 of its own and therefore remains in its position in relation to the housing 4. In the case of the LC connector 7 or MU connector 9, on the other hand, the connector butts with an edge of its housing 70 or 90 against the cover pin 42 while the connectors are being pushed into the adapter. FIG. 4a shows this situation as an enlarged, positionally correct detail, for the LC connector 7 and mirror-invertedly for the MU connector 9 in accordance with the cover pin position in the circle. If the connectors are pushed further into the adapter, the flexible tongue 421 with the cover pin 42 is pushed to the side and clears the path for the plug-in connector 7 or 9. The side wall here comprises, for example, only the tongue 421, which is surrounded on the outside only by the spring frame 50 or 55.

FIG. 6 shows an adapter 3'' with duplex housing 4, which has been fitted into an aperture 11 of a front panel 10 and arrested there by means of a spring 5' on the spring frame 55, which surrounds the adapter 3''. The arresting mechanism can be released by pressing the clip 54 of the spring 5', as already described in itself.

Inserted at the rear, as represented in FIG. 4, are two connectors 7 and 8 of the LC and LX.5 types, respectively, while at the front a cap 62 closes the adapter or both its openings at the same time.

The caps 60 for simplex connectors and 62 for duplex connectors according to FIGS. 3a and 6, preferably consist of flexible plastic, have a latching pin 61 for clipping in and fastening in a bore 46 on the housing 4, 30, 40, a jointed flexible clip 63 for the pivoting away of the closure 64, 64' of cap, in order to clear or close the openings of the adapter, at the same time as a guard against dust and—in the case of adapters without a laser shutter 44 —also as an eye guard. The front part 65 has a guide 66, in order to insert there an identification plate 97, which is provided with an inscription or identification, concerning the type of the adapters and the plug-in connectors to be inserted therein.

What is claimed:

1. An adapter in the manner of a coupling that can be inserted into a front panel from a front side and can be arrested by at least one spring, for optical-fiber plug-in connectors, the adapter comprising:
   at least a one-piece housing, said housing having at least one flange on at least one side of said housing, said flange protruding from a cross-section of said housing for selective abutment with the front panel; and
   at least one plug-in connector receptacle associated with said housing, said receptacle including at least one positively locking releasable arresting mechanism;
   wherein said receptacle includes an opening for alternate reception of at least two of three different types of plug-in connectors including a first type of plug-in connector and a second type of plug-in connector, and said arresting mechanism is suitable for each of said different types of plug-in connectors; and
   wherein said first type of plug-in connector is an LX.5 plug-in connector and said second type of plug-in connector is either an LC plug-in connector or an MU plug-in connector; and
   wherein said arresting mechanism includes at least one mechanism for the LX.5 plug-in connector, and a pin for actuating a cover of the LX.5 plug-in connector is arranged on a displaceable element on a wall of the adapter.

2. The adapter as defined by claim 1, wherein the adapter is designed as a simplex plug-in coupling.

3. The adapter as defined by claim 1, wherein the adapter is designed as a duplex plug-in coupling.

4. The adapter as defined by claim 1, wherein said displaceable element is formed inside said wall as an integral spring element.

5. The adapter as defined by claim 1, wherein an opening of said receptacle is closed by a cap, said cap being pivotally and releasably attached to said housing.

6. The adapter as defined by claim 5, wherein said cap is inserted into a snap-action device disposed outside of said housing.

7. The adapter as defined by claim 5, wherein said cap is disposed outside of said housing, said cap including a guide for an identification plate.

8. The adapter as defined by claim 1, wherein the adapter includes at least one spring disposed on said housing, said spring being actuated from the front side for gripping behind the front panel and releasing said spring from the front panel.

9. The adapter as defined by claim 8, wherein the at least one spring is designed as an unsupported resilient tongue that extends through an opening in said flange and in the front panel.

10. The adapter as defined by claim 8, wherein the at least one spring includes a spring frame that grips around said housing on at least three sides, said spring frame extending through said flange, and said spring frame including an unsupported resilient tongue.

11. The adapter as defined by claim 10, wherein the adapter includes a largest cross-section at an opening, said flange including at least one setback portion for abutment of said spring frame, and said spring frame does not protrude beyond said cross-section of said housing.

12. An adapter for optical-fiber connectors, the adapter comprising:
a housing including at least one housing member;
said housing member including at least one flange disposed on said housing, said flange protruding from said housing;
said housing including at least one plug-in connector receptacle disposed on said housing;
said receptacle including at least one arresting mechanism disposed on a side of said housing; and
wherein said receptacle includes an opening for alternate reception of at least two different types of plug-in connectors including a first type of plug-in connector and a second type of plug-in connector and said arresting mechanism is suitable for each of said different types of plug-in connectors; and
wherein said first type of plug-in connector is an LX.5 plug-in connector and said second type of plug-in connector is either an LC plug-in connector or an MU plug-in connector; and
wherein said arresting mechanism includes at least one mechanism for the LX.5 plug-in connector, and a pin for actuating a cover of the LX.5 plug-in connector is arranged on a displaceable element on a wall of the adapter.

13. The adapter as defined by claim 12, wherein the adapter is designed as a simplex plug-in coupling.

14. The adapter as defined by claim 12, wherein the adapter is designed as a duplex plug-in coupling.

15. The adapter as defined by claim 12, wherein a pin for actuating a cover of said receptacle is disposed proximate a biasing member on a wall of the adapter.

16. The adapter as defined by claim 15, wherein said biasing member is disposed inside said wall as a spring member.

17. The adapter as defined by claim 12, wherein an opening of said receptacle is closed by a cap associated with said housing.

18. The adapter as defined by claim 17, wherein said cap is associated with a snap-action member on said housing.

19. The adapter as defined by claim 17, wherein said cap is disposed proximate an exterior face of said housing.

20. The adapter as defined by claim 12, wherein the adapter includes at least one latching member disposed on said housing, whereby actuating said latching member releases the adapter.

21. The adapter as defined by claim 20, wherein said latching member includes a resilient tongue disposed proximate said flange, said latching member extending through said flange into a front panel.

22. The adapter as defined by claim 21, wherein said latching member including a frame is in selective contact with said housing, said latching member extending through said flange and including said resilient tongue.

23. The adapter as defined by claim 22, wherein the adapter includes at least one setback portion for abutment to at least one element of said frame and said frame is disposed inside said housing proximate said receptacle.

* * * * *

UNITED STATES PATENT AND TRADEMARK OFFICE
CERTIFICATE OF CORRECTION

PATENT NO. : 7,182,524 B2  
APPLICATION NO. : 10/487656  
DATED : February 27, 2007  
INVENTOR(S) : Kramer et al.

It is certified that error appears in the above-identified patent and that said Letters Patent is hereby corrected as shown below:

Col. 1, line 28: "http://www.bicsi.org/prico8/sld001.htmsld035.htm)." should read --http://www.bicsi.org/prico8/sld001.htm-sld035.htm).--

Col. 2, line 53: Insert omitted paragraph as follows: --In the case of the previous couplings and connectors, it is not evident how they can be released from the front panel without separating the optical-fiber connection.--

Col. 5, line 23: "housing cross section. 33, close" should read --housing cross section 33, close--

Col. 5, line 46: "the, cover. The" should read --the cover. The--

Col. 6, line 46, claim 1: "at least two of three different" should read --at least two different--

Signed and Sealed this

Sixth Day of November, 2007

JON W. DUDAS  
*Director of the United States Patent and Trademark Office*